United States Patent
Agin

(12) 
(10) Patent No.: US 6,337,989 B1
(45) Date of Patent: *Jan. 8, 2002

(54) METHOD FOR IMPROVING PERFORMANCES OF A MOBILE RADIOCOMMUNICATION SYSTEM USING A POWER CONTROL ALGORITHM

(75) Inventor: Pascal Agin, Sucy en Brie (FR)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/397,078

(22) Filed: Sep. 16, 1999

(30) Foreign Application Priority Data

Aug. 23, 1999 (EP) .............................. 99402100

(51) Int. Cl.[7] ..................... H04Q 7/20; H04B 17/00; H04B 7/00; H04B 7/185; H04B 7/216
(52) U.S. Cl. ........................ 455/522; 455/69; 455/70; 455/67.1; 370/318; 370/320; 370/335
(58) Field of Search ..................... 455/69, 70, 127, 455/343, 13.4, 522, 296, 298, 226.3, 226.2, 226.1, 9, 10, 504, 67.1, 67.6, 68, 572, 422; 375/224–227, 252, 296, 297, 219, 148; 370/317, 318, 332, 333, 335, 342, 320

(56) References Cited

U.S. PATENT DOCUMENTS

| | | | |
|---|---|---|---|
| 3,925,782 A | | 12/1975 | Anderl et al. |
| 5,513,183 A | * | 4/1996 | Kay et al. .................. 455/422 |
| 5,751,763 A | * | 5/1998 | Bruckert ................ 455/522 X |
| 5,852,782 A | * | 12/1998 | Komatsu .................... 455/522 |
| 5,915,216 A | | 6/1999 | Lysejko |
| 6,192,249 B1 | * | 2/2001 | Padovani .............. 455/67.1 X |

FOREIGN PATENT DOCUMENTS

| | | |
|---|---|---|
| EP | 0 388 895 A2 | 9/1990 |
| WO | WO 98/36508 | 8/1998 |

* cited by examiner

Primary Examiner—Tracy Legree
(74) Attorney, Agent, or Firm—Sughrue Mion, PLLC

(57) ABSTRACT

A method for improving performances of a mobile radio-communication system using a power control algorithm and being subject to transmission interruptions, wherein a recovery period is provided following a transmission interruption to compensate for the effects of the transmission interruption on the power control algorithm, and wherein the recovery period includes different parts wherein different types of compensation are successively carried out, these types being determined so as to ensure that a minimum compensation can first be obtained and that compensation is not higher than necessary thereafter.

27 Claims, 6 Drawing Sheets

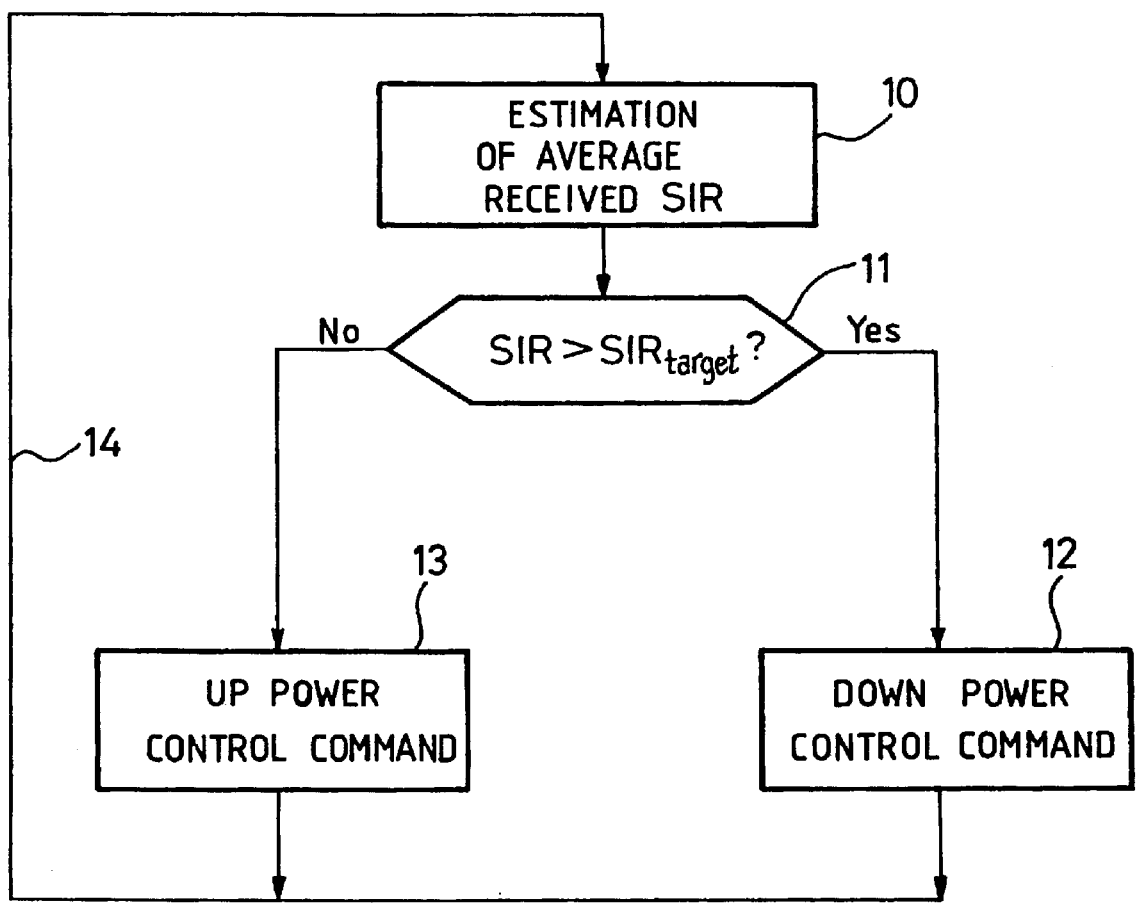

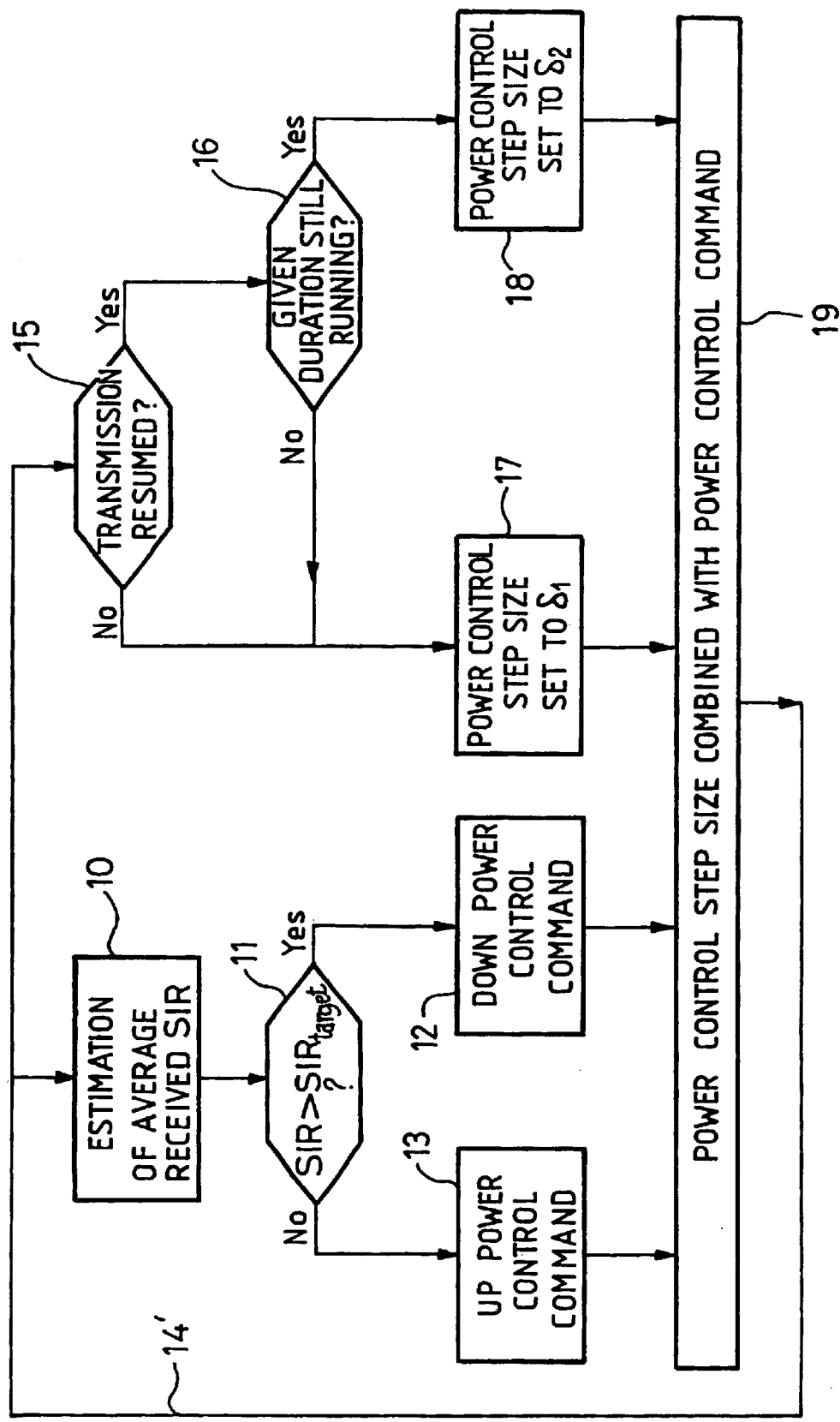
FIG_2

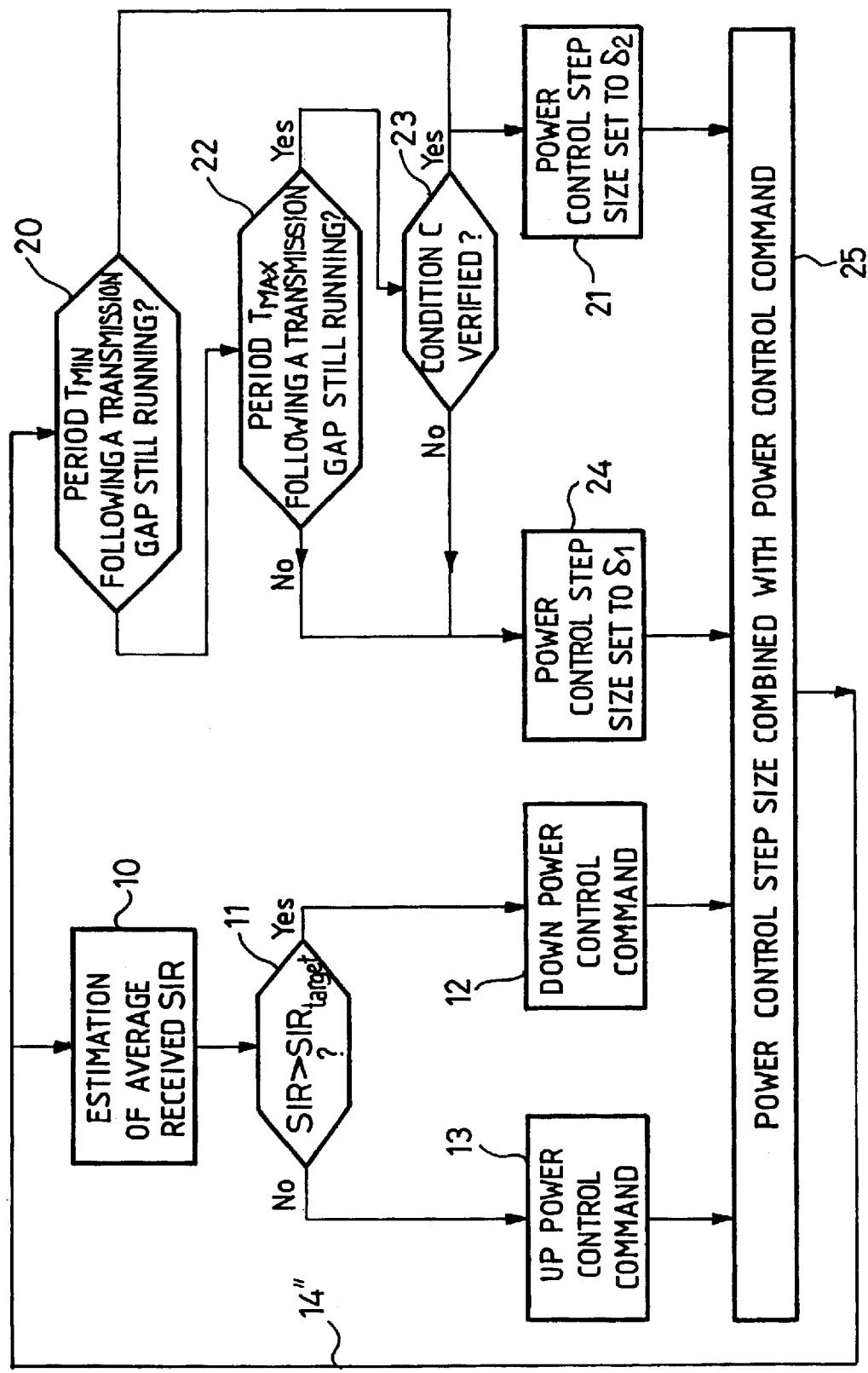

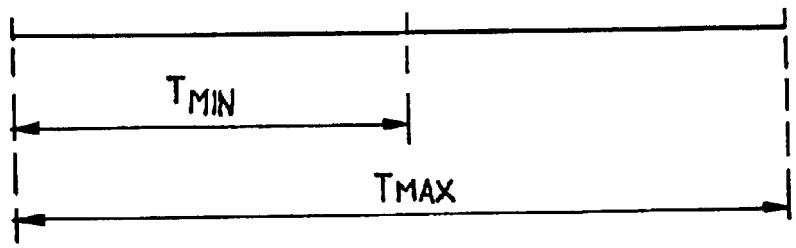
FIG_4
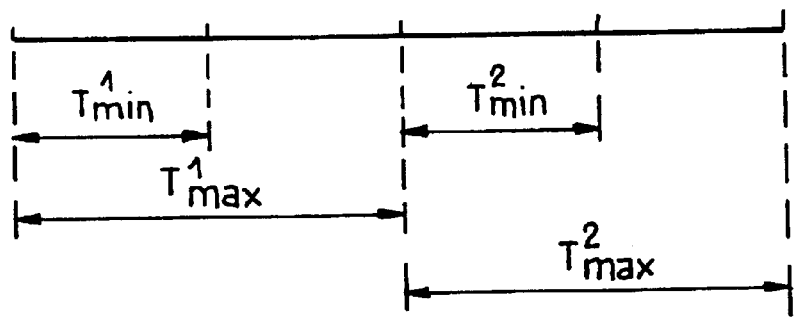
FIG_5
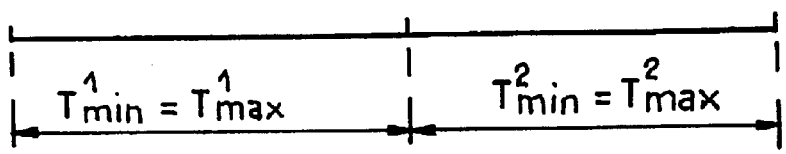
FIG_6

FIG_7
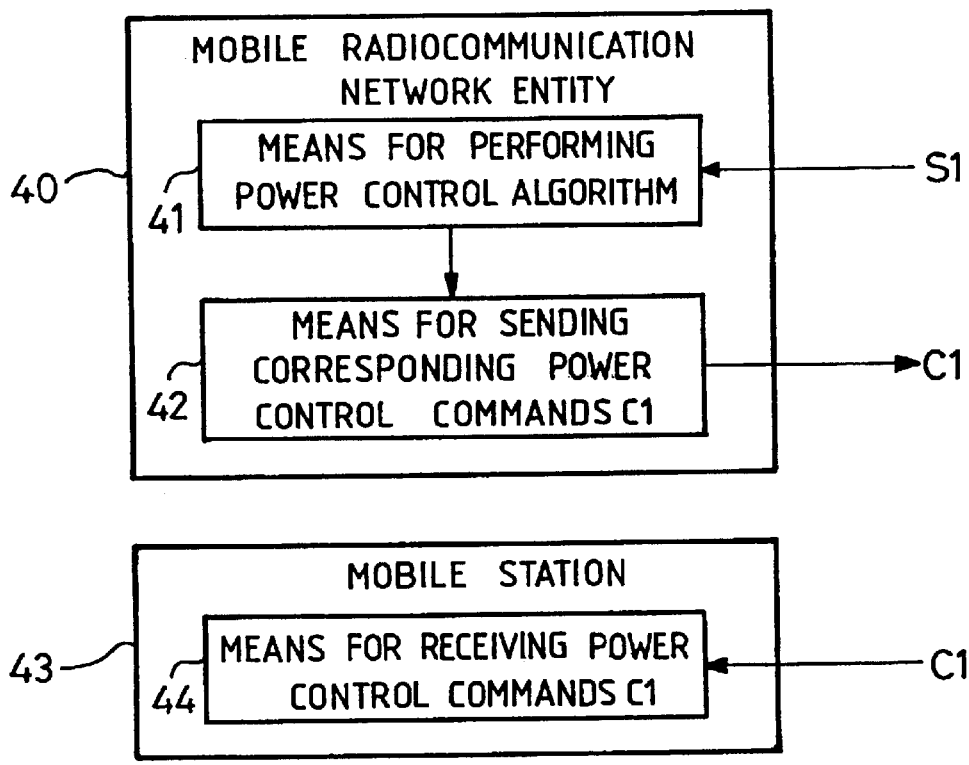
FIG_8
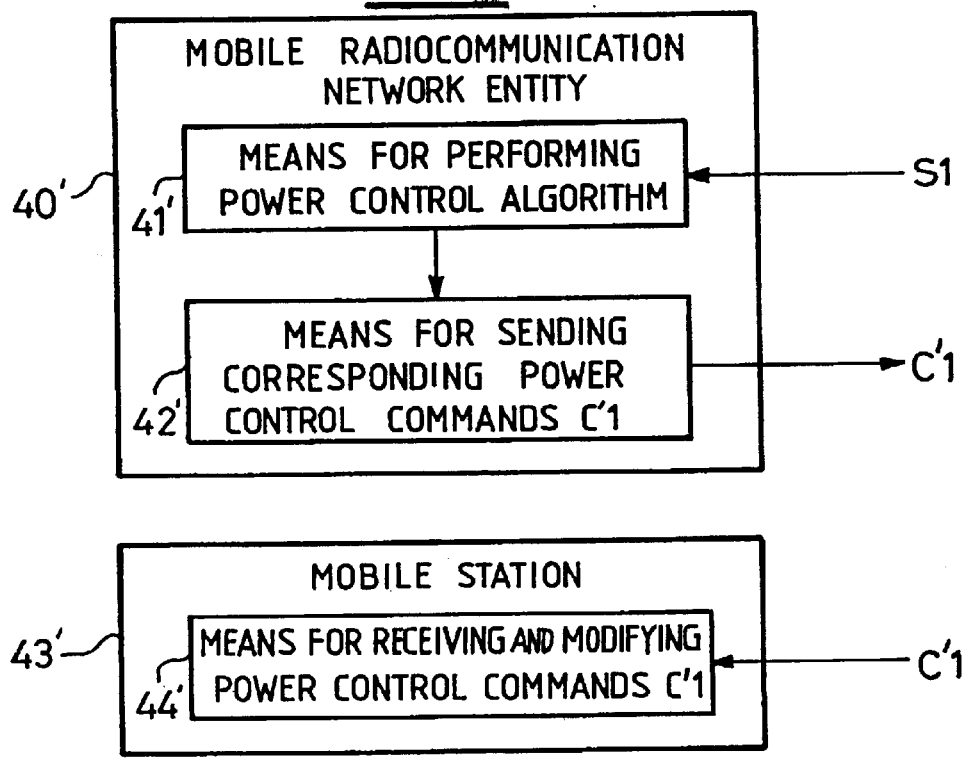

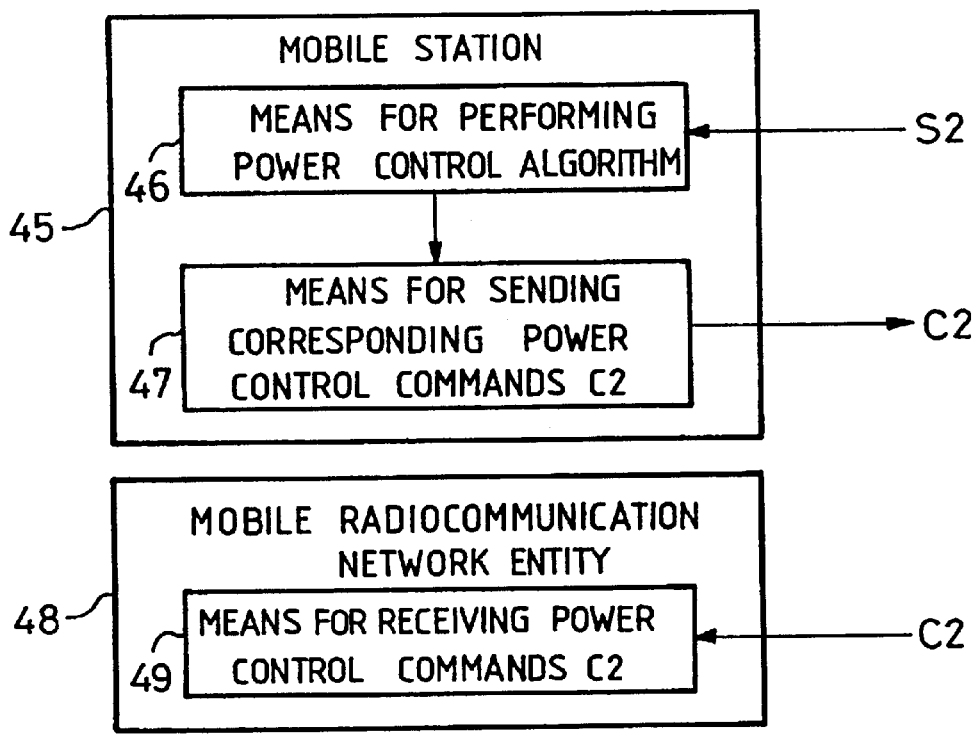
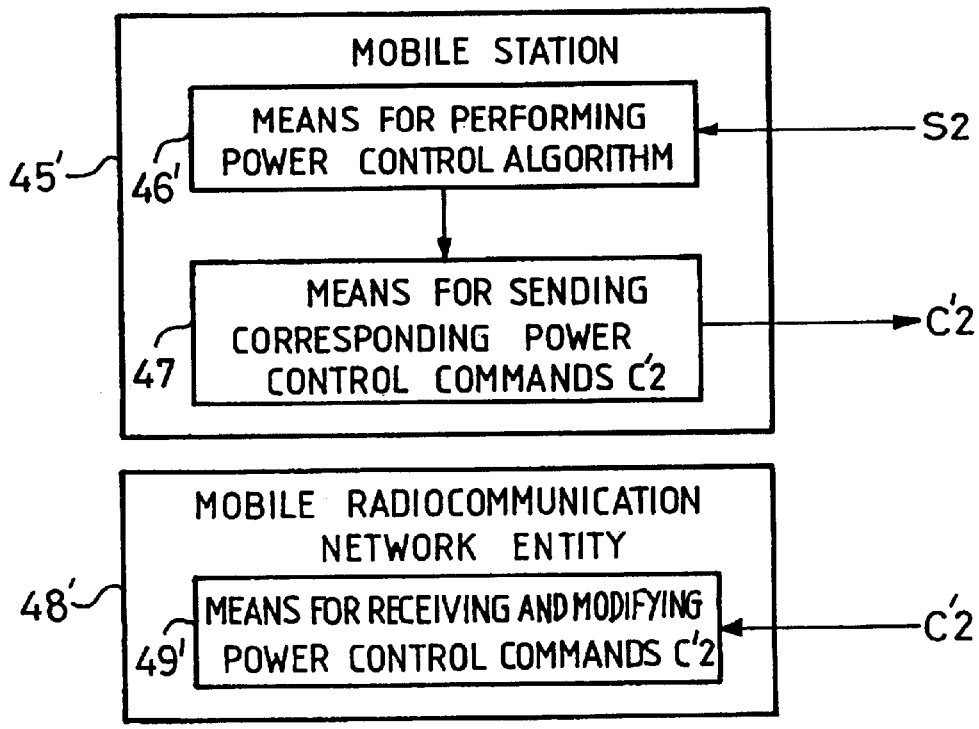

US 6,337,989 B1

METHOD FOR IMPROVING PERFORMANCES OF A MOBILE RADIOCOMMUNICATION SYSTEM USING A POWER CONTROL ALGORITHM

BACKGROUND OF THE INVENTION

The present invention is generally concerned with mobile radiocommunication systems.

The present invention is more particularly concerned with power control techniques used in such systems to improve performances (in terms of quality of service, of capacity, . . . etc.).

The present invention is in particular applicable to mobile radiocommunication systems of CDMA ("Code Division Multiple Access") type. In particular, the present invention is applicable to UMTS ("Universal Mobile Telecommunication System").

As is known, CDMA systems use two types of power control techniques, a so-called open-loop power control technique, and a so-called closed loop power control technique (also called hereinafter CLPC). These power control techniques may be recalled for example for the uplink transmission direction, i.e. from MS ("Mobile Station") to BTS ("Base Transceiver Station"). In the open-loop power control, a MS transmit power is controlled based on the power received by this MS from a BTS. In the CLPC, a MS transmit power is controlled based on the transmission quality of the link between this MS and a BTS, as estimated at this BTS.

The transmission quality of a link between a MS and a BTS depends on the ratio of the received signal power and the interference power, also called SIR (Signal-to-Interference Ratio). When the SIR of a MS is low, or equivalently when the powers of the other MSs are much higher than its power, its performances dramatically decrease. The CLPC algorithm enables to keep the SIR of each user as close as possible to the target SIR.

The principle of the CLPC algorithm is that the BTS periodically estimates the SIR of the received signal from each MS, and compares this estimated SIR to a target SIR ($SIR_{target}$). If the estimated SIR is lower than the target SIR, the BTS sends a power control command to the MS, for the MS to increase its transmit power. Otherwise, the BTS sends a power control command to the MS, for the MS to decrease its transmit power. The target SIR is chosen by the BTS as a function of the required quality of service.

To be efficient and track the variations of the SIR as closely as possible, in particular in fast changing environments, the CLPC needs to be rapid; as all example, in third generation systems like for example UMTS, power control commands are typically sent to a MS every slot in a frame (a slot being an elementary time unit in a data unit, or frame, transmitted in such a system, the frame duration being typically equal to 10 ms, and the slot duration to $\frac{1}{15}$ of the frame duration).

Now there are some situations in mobile radiocommunication systems, in which transmission of power control commands has to be momentarily interrupted. This will also hereinafter be referred to as transmission interruptions. This is also referred to as "transmission gaps" in UMTS system for example.

As an example, in CDMA systems, downlink transmission from a BTS to a MS may momentarily be interrupted to allow this MS to make measurements on frequencies other than the one used for this downlink transmission (in particular for handover preparation purposes, in particular inter-frequency handovers). Such a transmission mode including transmission interruptions is also referred to as "slotted mode" or "compressed mode" in UMTS system for example. A transmission interruption may last several slots (typically up to 15 slots, i.e. one frame, in downlink compressed mode). During these transmission interruptions, the CLPC is interrupted. Thus, the BTS does not send any more power control commands to the MS, and the uplink signals from this MS are no longer power controlled. Uplink transmission may simultaneously be interrupted, but in either case, as a result, the efficiency of the CLPC is significantly decreased, and the performances of the system may be seriously degraded.

In European patent application no. 99400894.4 filed on Apr. 12, 1999 by Applicant, a solution has been proposed to avoid such degradations of performances, due to such transmission interruptions.

Essentially, according to this prior patent application, when transmission is resumed after a transmission interruption, said power control algorithm is implemented with at least one modified parameter, for a given duration, said at least one modified parameter and said given duration being determined so as to compensate for the effects of said transmission interruption on power control.

According to a first embodiment disclosed in this prior patent application, said given duration has a predetermined value.

According to a second embodiment disclosed in this prior patent application, said given duration is determined to be passed when a given condition is fulfilled, based for example on successive power control results with said at least one modified parameter, for example when two consecutive power control commands obtained with said at least one modified parameter are opposed.

This second embodiment thus has the advantage that this given duration, or "recovery period", is not fixed and can be adapted to each situation, depending for example on mobile speed, on environment, . . . etc. However, adaptive algorithms are usually very sensitive to errors (which in this context include SIR estimation errors, power control commands errors, . . . ). Thus, with an adaptive compensation length, there is a risk that the recovery period be too short, because of such errors.

On the other hand, a fixed recovery period offers the advantage to be robust to errors, but is not optimal, since it cannot be adapted to each situation.

The present invention enables to take profit of both types of algorithms, i.e. offers the advantage of an adaptive algorithm having a lower sensitivity to errors, or of a fixed algorithm having more flexibility.

SUMMARY OF THE INVENTION

An object of the present invention is therefore a method for improving performances of a mobile radiocommunication system using a power control algorithm and being subject to transmission interruptions, a method wherein a recovery period is provided following a transmission interruption, to compensate for the effects of said transmission interruption on said power control algorithm, and wherein said recovery period includes different parts wherein different types of compensation are successively carried out, said types being determined so as to ensure that a minimum compensation can first be obtained, and that compensation is not higher than necessary thereafter.

According to another object of this invention, said recovery period includes a first part having a length $T_{MIN}$ wherein a fixed-length compensation is carried out, followed by a second part having a maximum length $T_{MAX}-T_{MIN}$ wherein an adaptive-length compensation is carried out, $T_{MIN}$ being the minimum compensation length inside said recovery period, and $T_{MAX}$ being the maximum compensation length inside said recovery period.

According to another object of the present invention, said first and second parts each have a length equal to half of the length of a transmission interruption period.

According to another object of the present invention, said recovery period includes N segments, each segment "n" including a first part having a length $T_{min}^n$ wherein a fixed-length compensation is carried out, followed by a second part having a maximum length $T_{max}^n-T_{min}^n$ wherein an adaptive-length compensation is carried out, $T_{min}^n$ being the minimum compensation length inside segment "n", and $T_{max}^n$ being the maximum compensation length inside segment "n".

According to another object of this invention, parameters defining said parts of a recovery period and/or said types of compensation may vary from one recovery period to another one.

According to another object of this invention, parameters defining said parts of a segment and/or said types of compensation may vary from one segment to another one.

According to another object of the present invention, said compensation being obtained by modifying at least one parameter of said power control algorithm during said recovery period, said at least one modified parameter has a value which varies from one segment to another one inside said recovery period, in the sense of a lower compensation from the beginning to the end of this recovery period.

According to another object of this invention, said at least one modified parameter having a value which varies from one segment to another one is an increased power control step size having a value which decreases from one segment to a next one inside said recovery period.

According to another object of the present invention, said minimum length $T_{min}^n$ is provided equal to said maximum length $T_{max}^n$.

According to another object of the invention, said power control is performed in the uplink transmission direction of said mobile radiocommunication system.

According to another object of the invention, said power control is performed in the downlink transmission direction of said mobile radiocommunication system.

According to another object of the invention, said mobile radiocommunication system is of CDMA type.

Another object of the present invention is a mobile radiocommunication system including two entities involved in a power control algorithm, and wherein means are provided in one of said entities for signalling to the other entity parameters defining said parts of a recovery period and/or said types of compensation to be carried out in said parts, for performing such a method.

According to another object of this invention, one of said two entities is a mobile radiocommunication network entity.

According to another object of this invention, one of said two entities is a mobile station.

Another object of the present invention is a mobile radiocommunication network entity (such as in particular BTS) for performing such a method.

Another object of the present invention is a mobile station (MS) for performing such a method.

According to another object of the invention, a mobile radiocommunication network entity comprises, for performing said method in said uplink transmission direction:
  means for performing an uplink power control algorithm, and for compensating for the effects of transmission interruptions on said power control algorithm, according to said method,
  means for sending corresponding power control commands to a mobile station.

According to another object of the invention, a mobile station comprises, for performing said method in said uplink transmission direction:
  means for receiving said power control commands from a mobile radiocommunication network entity.

According to another object of the invention, a mobile radiocommunication network entity comprises, for performing said method in said uplink transmission direction:
  means for implementing an uplink power control algorithm,
  means for sending corresponding power control commands to a mobile station.

According to another object of the invention, a mobile station comprises, for performing said method in said uplink transmission direction:
  means for receiving said power control commands from a mobile radiocommunication network entity, and for modifying said power control commands, so as to compensate for the effects of transmission interruptions on said power control algorithm, according to said method.

According to another object of the invention, a mobile station comprises, for performing said method in said downlink transmission direction:
  means for performing a downlink power control algorithm, and for compensating for the effects of transmission interruptions on said power control algorithm, according to said method,
  means for sending corresponding power control commands to a mobile radiocommunication network entity.

According to another object of the invention, a mobile radiocommunication network entity, comprises, for performing said method in said downlink transmission direction:
  means for receiving said power control commands from a mobile station.

According to another object of the invention, a mobile station comprises, for performing said method in said downlink transmission direction:
  means for implementing a downlink power control algorithm,
  means for sending corresponding power control commands to a mobile radiocommunication network entity.

According to another object of the invention, a mobile radiocommunication network entity comprises, for performing said method in said downlink transmission direction:
  means for receiving said power control commands from a mobile station, and for modifying said power control commands so as to compensate for the effects of transmission interruptions on said power control algorithm, according to said method.

BRIEF DESCRIPTION OF THE DRAWINGS

These and other objects of the present invention will become more apparent from the following description taken in conjunction with the accompanying drawings:

FIG. 1 is a diagram intended to illustrate a current CLPC algorithm,

FIG. 2 is a diagram intended to illustrate a CLPC algorithm, modified so as to include a method according to the above-mentioned prior patent application, FIG. 3 is a diagram intended to illustrate a CLPC algorithm, modified so as to include a method according to the present invention, FIG. 4 is a diagram intended to illustrate a first example of different parts provided in a recovery period, FIG. 5 is a diagram intended to illustrate a second example of different parts provided in a recovery period, FIG. 6 is a diagram intended to illustrate a third example of different parts provided in a recovery period, FIG. 7 is a diagram intended to illustrate the type of means which may be required in a mobile network entity and in a mobile station to perform a method according to the present invention, in the uplink transmission direction of a mobile radiocommunication system, according to a first embodiment, FIG. 8 is a diagram intended to illustrate the type of means which may be required in a mobile network entity and in a mobile station to perform a method according to the present invention, in the uplink transmission direction of a mobile radiocommunication system, according to a second embodiment, FIG. 9 is a diagram intended to illustrate the type of means which may be required in a mobile station and in a mobile network entity to perform a method according to the present invention, in the downlink transmission direction of a mobile radiocommunication system, according to a first embodiment, FIG. 10 is a diagram intended to illustrate the type of means which may be required in a mobile station and in a mobile network entity to perform a method according to the present invention, in the downlink transmission direction of a mobile radiocommunication system, according to a second embodiment.

MORE DETAILED DESCRIPTION OF THE DRAWINGS

As an example, description of FIGS. 1, 2 and 3 will be made for uplink power control, but it should be understood that the present invention also applies to downlink, or both uplink and downlink, power control.

As recalled in FIG. 1, a current CLPC algorithm comprises the following steps, for each time $t_i$:

➢ At step 10, the BTS estimates the averaged received SIR during a period T,

➢ At step 11, the BTS compares this SIR to a target SIR, $SI_{target}$,

➢ If SIR>$SIR_{target}$, at step 12 the BTS sends a "down" power control command to the MS, for the MS to decrease its power by δ dB, where δ is the power control step size of the algorithm, ➢ If SIR<$SIR_{target}$ at step 13 the BTS sends an "up" power control command to the MS, for the MS to increase its power by δ dB.

This is periodically repeated, with a repetition period T, as illustrated by loop 14.

An example of modification of this CLPC algorithm so as to include a method according to the above-mentioned prior patent application is recalled in FIG. 2.

The steps which can be common to FIGS. 1 and 2 are noted with the same references.

In the example of FIG. 2:

➢ At step 10, the BTS estimates the averaged received SIR during a period T,

➢ At step 11, the BTS compares this SIR to a target SIR, $SIR_{target}$,

➢ If SIR>$SIR_{target}$ at step 12 the BTS provides a "down" power control command for the MS, for the MS to decrease its power by δ dB, ➢ If SIR<$SIP_{target}$, at step 13 the BTS provides an "up" power control command for the MS, for the MS to increase its power by δ dB, ➢ Besides, it is checked at step 15 if transmission is resumed after a transmission interruption period Tint, and in case transmission is resumed, it is checked at step 16 if a given duration T' following this interruption period Tint is still running, ➢ If transmission is not resumed after a transmission interruption, or if it is resumed and if the duration T' is passed, at step 17 the power control step size for the MS is set to δ=$δ_1$, where $δ_1$ corresponds to a non-modified power control step size, ➢ If transmission is resumed after a transmission interruption, and if the duration T' is still running, at step 18 the power control step for the MS is set to δ=$δ_2$, where $δ_2$ corresponds to a modified power control step size, in particular an increased power control step size, ➢ at step 19 the thus determined power control step size $δ_1$ or $δ_2$ is combined with the "up" or "down" power control command provided at step 12 or 13, to obtain a resulting power control command for the MS.

This is periodically repeated, with a period T, as indicated by loop 14'.

According to this prior patent application, parameters T' and $δ_2$ may be determined according to various possibilities:

In a simplest way, parameters T' and $δ_2$ may have predetermined values; for example the values T'=Tint and $δ_2$=2 $δ_1$ have been found to be interesting in practice, In a more elaborated way, it may for example be determined that duration T' is passed when a certain condition is fulfilled, such as for instance when two consecutive power control commands obtained with power control step $δ_2$ are opposed (i.e. one is an "up" power control command and the other one a "down" power control command), Parameters T' and $δ_2$ may also for example be determined based on statistics on power control results for a transmission period before said transmission interruption; for example the largest the variations of a received signal power before the interruption, the largest $δ_2$ and T', and vice-versa.

An example of modification of this CLPC algorithm so as to include a method according to the present invention is disclosed in FIG. 3. It should however be noted that this example is not limitative and that the invention might as well be applied to other examples of algorithms.

Steps or parameters which can be common to FIGS. 1, 2 and 3 are noted with the same references or notations.

The example of algorithm illustrated in FIG. 3 can be written as follows:

➢ At step 10, the BTS estimates the averaged received SIR during a period T,

➢ At step 11, the BTS compares this SIR to a target SIR, $SIR_{target}$,

➢ If SIR>$SIR_{target}$, at step 12 the BTS provides a "down" power control command for the MS, for the MS to decrease its power by δ dB,

- If SIR<SIR$_{target}$, at step 13 the BTS provides an "up" power control command for the MS, for the MS to increase its power by δ dB, Besides:

- if a period T$_{MIN}$ following a transmission gap is still running, as checked at step 20, the power control step of this MS is set to δ=δ$_2$, as illustrated by step 21,
- if a period T$_{MIN}$ following a transmission gap is passed but a period T$_{MAX}$ following this transmission gap is still running, as checked at step 22, and if a condition C is verified, as checked at step 23, the power control step of this MS is set to δ=δ$_2$, as also illustrated by step 21,
- Otherwise, the power control step of the MS is set to δ=δ$_1$, as illustrated by step 24,
- at step 25 the thus determined power control step size δ$_1$ or δ$_2$ is combined with the "up" or "down" power control command provided at step 12 or 13, to obtain a resulting power control command for the MS.

This is periodically repeated, with a period T, as illustrated by loop 14'.

In this example, as in FIG. 2, δ$_1$ corresponds to a non-modified power control step size, and δ$_2$ corresponds to a modified power control step size, in particular an increased power control step size.

T$_{MIN}$, T$_{MAX}$, (with T$_{MAX}$≧T$_{MIN}$), as well as δ$_1$, δ$_2$, are parameters of this algorithm. T$_{MIN}$ is the minimum compensation length inside the recovery period, and T$_{MAX}$ is the maximum compensation length inside the recovery period. If T$_{MIN}$=T$_{MAX}$, the recovery period is fixed. If T$_{MIN}$=0, the recovery period is fully adaptive. In general, these parameters can be different for each recovery period, i.e. can depend on the compressed mode parameters (transmission gap length, . . . ) as well as any other criteria (environment, . . . ). They may also be based on statistics on the signal before the transmission gap. The particular case where T$_{MIN}$=⌊TGL/2⌋ (⌊.⌋ denotes the integer part), T$_{MAX}$=TGL and δ$_2$=2δ$_1$ (where TGL is the transmission gap length) is of particular interest.

The condition C is also part of the algorithm. This condition is Boolean (true or false) and enables to adapt the recovery period as a function of environment, speed, . . . or any other factor. For example the condition C can be that the current and previous power control commands are opposed. It can also be that a current and previous power control commands are opposed and that these commands are reliable (i.e. it is likely that these commands are true. This reliability can be estimated by any classic method).

Therefore, according to the example illustrated in FIG. 3, a recovery period includes a first part having a length T$_{MIN}$ wherein a fixed-length compensation is carried out, followed by a second part having a maximum length T$_{MAX}$−T$_{MIN}$ wherein an adaptive-length compensation is carried out. This is also illustrated in FIG. 4.

An extension of this example would be to divide the recovery period into N segments, each segment "n" (with 1≦n≦N) including a first part having a length T$_{min}^n$ wherein a fixed-length compensation is carried out, and a second part having a maximum length T$_{max}^n$−T$_{min}^n$ wherein an adaptive-length compensation is carried out, T$_{min}^n$ being the minimum (fixed) compensation length inside this segment, and T$_{max}^n$ being the maximum compensation length inside this segment. This is also illustrated in FIG. 5, as an example for N=2.

An algorithm like the one illustrated in FIG. 3 for example would then be applied for each segment, segment "n" being used if the compensation length inside segment "n−1" is equal to the maximum compensation length T$_{max}^{n-1}$.

Besides, by using a different power control step size in each segment (like the one noted δ$_2$ in the example of FIG. 3, and noted δ$_2^n$ for segment "n"), this would enable to slowly decrease the power control step size inside a recovery period, after having increased itat the beginning of this recovery period.

For example, we could consider N=2, δ$_2^1$=2δ$_1$ and δ$_2^2$=1,5 δ$_1$. Power control step size δ$_1$ would be used before and after said recovery period, power control step size δ$_2^1$ would be used in the first segment of the recovery period, and power control step size δ$_2^2$ would be used in the second segment of the recovery period.

In general, parameters T$_{min}^n$, T$_{max}^n$, δ$_2^n$, may have different values for each segment "n". The power control algorithm may also be different for each segment "n".

Besides, T$_{min}^n$ could be provided equal to T$_{max}^n$. This is also illustrated in FIG. 6 for N=2 for example. For example, for N=2, we could consider T$_{min}^1$=T$_{max}^1$=TGL/2 and T$_{min}^2$=T$_{max}^2$=TGL/2. No condition like condition C would then be provided, i.e. no adaptive-length compensation would be provided; instead, a decreasing power control step size could for example be used.

Besides, parameters defining said parts of a recovery period and/or said types of compensation to be carried out in said parts may need to be signalled from one of the two entities (mobile station or mobile radiocommunication network entity) involved in a power control algorithm, to the other one of said entities, for performing such a method.

As can be seen from this description, the present invention may be implemented in a variety of ways. It will be understood that it is not possible to give here an exhaustive list of all examples or variants . The general idea, in the light of the foregoing, is that said recovery period includes different parts wherein different types of compensation are successively carried out, said types being determined so as to ensure that a minimum compensation can first be obtained, and that compensation is not higher than necessary thereafter. Besides, a minimum compensation, or a too high compensation, of course depends on each particular context, conditions or requirements, as can be appreciated by a person skilled in the art.

The present invention also has for its object an entity for a mobile radiocommunication network (such as in particular BTS), as well as a mobile station (MS), for carrying out such a method.

The present invention may be used for power control in the uplink transmission direction (from MS to BTS) as well as in the downlink transmission direction (from BTS to MS).

In the uplink direction:

According to a first embodiment, illustrated at FIG. 7, and corresponding for example, in the example of FIG. 3, to the case where steps 20 to 25 are performed in the BTS:

- a mobile radiocommunication network entity, such as illustrated at 40, essentially comprises, further to other classical means (not mentioned here and which may be classical):
  - means 41 for performing an uplink power control algorithm, from signals noted S1 received from a mobile station, and for compensating for the effects of said transmission interruptions on said power control algorithm, according to said method,
  - means 42 for sending corresponding power control commands noted C1 to a mobile station,
- a mobile station, such as illustrated at 43, essentially comprises, further to other classical means (not mentioned here and which may be classical):

means 44 for receiving power control commands C1 from a mobile radiocommunication network entity, provided according to such a method.

According to a second embodiment, illustrated at FIG. 8 and corresponding for example, in the example of FIG. 3, to the case where steps 20 to 25 are performed in the MS:

a mobile radiocommunication network entity, such as illustrated at 40', essentially comprises, further to other classical means (not mentioned here and which may be classical):
 means 41' for implementing an uplink power control algorithm, from signals noted S1 received from a mobile station,
 means 42' for sending corresponding power control commands noted C'1 to a mobile station,
a mobile station, such as illustrated at 43', essentially comprises, further to other classical means (not mentioned here and which may be classical):
 means 44' for receiving power control commands C'1 from a mobile radiocommunication network entity, and for modifying said power control commands so as to compensate for the effects of the transmission interruptions on said power control algorithm, according to such a method.

In the downlink direction:

According to a first embodiment, illustrated at FIG. 9:

a mobile station, such as illustrated at 45, essentially comprises, further to other classical means (not mentioned here and which may be classical):
 means 46 for performing a downlink power control algorithm, from signals noted S2 received from a mobile network entity, and for compensating for the effects of transmission interruptions on said power control algorithm, according to said method,
 means 47 for sending corresponding power control commands noted C2 to a mobile network entity,
a mobile radiocommunication network entity, such as illustrated at 48, essentially comprises, further to other classical means (not mentioned here and which may be classical):
means 49 for receiving power control commands C2 from a mobile station, provided according to such a method.

According to a second embodiment, illustrated at FIG. 10:

a mobile station, such as illustrated at 45', essentially comprises, further to other classical means (not mentioned here and which may be classical):
 means 46' for implementing a downlink power control algorithm, from signals noted S2 received from a mobile network entity,
 means 47' for sending corresponding power control commands noted C'2 to a mobile network entity,
a mobile radiocommunication network entity, such as illustrated at 48', essentially comprises, further to other classical means (not mentioned here and which may be classical):
 means 49' for receiving power control commands C'2 from a mobile station, and for modifying said power control commands so as to compensate for the effects of transmission interruptions on said power control algorithm, according to such a method.

Means such as 41, 41', 44', 46, 46', 49' do not need to be more fully disclosed than as been made above by their function, for a person skilled in the art. Besides, means such as 42, 44, 47, 49, or 42', 44', 47', 49' may operate according to any known type of signalling procedures, or protocols, in such type of systems, and therefore do not either need to be more fully disclosed than has been made above, by their function.

What is claimed is:

1. A method for improving performances of a mobile radiocommunication system using a power control algorithm and being subject to transmission interruptions, a method wherein a recovery period is provided following a transmission interruption, to compensate for the effects of said transmission interruption on said power control algorithm, and wherein said recovery period includes different parts wherein different types of compensation are successively carried out, said types being determined so as to ensure that a minimum compensation can first be obtained, and that compensation is not higher than necessary thereafter.

2. A method according to claim 1, wherein said recovery period includes a first part having a length $T_{MIN}$ wherein a fixed-length compensation is carried out, followed by a second part having a maximum length $T_{MAX}-T_{min}$ wherein an adaptive-length compensation is carried out, $T_{MIN}$ being the minimum compensation length said recovery period, and $T_{MAX}$ being the maximum compensation length inside said recovery period.

3. A method according to claim 2, wherein said first and second parts each have a length equal to half of the length of a transmission interruption period.

4. A method according to claim 1, wherein said recovery period includes N segments, each segment "n" including a first part of length $T_{min}^n$ wherein a fixed-length compensation is carried out, followed by a second part having a maximum length $T_{max}^n-T_{min}^n$ wherein an adaptive-length compensation is carried out, $T_{min}^n$ being the minimum compensation length inside segment "n", and $T_{max}^n$ being the maximum compensation length inside segment "n".

5. A method according to claim 4, wherein parameters defining said parts of a segment and/or said types of compensation may vary from one segment to another one.

6. A method according to claim 4, wherein, said compensation being obtained by modifying at least one parameter of said power control algorithm during said recovery period, said at least one modified parameter has a value which varies from one segment to another one inside said recovery period, in the sense of a lower compensation from the beginning to the end of this recovery period.

7. A method according to claim 6, wherein said at least one modified parameter having a value which varies from one segment to another one is an increased power control step size having a value which decreases from one segment to a next one inside said recovery period.

8. A method according to claim 4, wherein said minimum length $T_{min}^n$ is provided equal to said maximum length $T_{max}^n$.

9. A method according to claim 1, wherein parameters defining said parts of a recovery period and/or said types of compensation may vary from one recovery period to another one.

10. A method according to claim 1, wherein said power control is performed in the uplink transmission direction of said mobile radiocommunication system.

11. A mobile radiocommunication network entity comprising, for performing a method according to claim 10:
 means for performing an uplink power control algorithm, and for compensating for the effects of transmission interruptions on said power control algorithm, according to said method,
 means for sending corresponding power control commands to a mobile station.

12. A mobile station comprising:
 means for receiving power control commands frown a mobile radiocommunication network entity according to claim 11.

13. A mobile radiocommunication network entity comprising, for performing a method according to claim 10:
- means for implementing an uplink power control algorithm,
- means for sending corresponding power control commands to a mobile station.

14. A mobile station comprising, for performing a method according to claim 10:
- means for receiving power control commands from a mobile radiocommunication network entity, and for modifying said power control commands, so as to compensate for the effects of transmission interruptions on said power control algorithm, according to said method.

15. A method according to claim 1, wherein said power control is performed in the downlink transmission direction of said mobile radiocommunication system.

16. A mobile station comprising, for performing a method according to claim 15:
- means for performing a downlink power control algorithm, and for compensating for the effects of transmission interruptions on said power control algorithm, according to said method,
- means for sending corresponding power control commands to a mobile radiocommunication network entity.

17. A mobile radiocommunication network entity comprising:
- means for receiving power control commands from a mobile station according to claim 16.

18. A mobile station comprising, for performing a method according to claim 15:
- means for implementing a downlink power control algorithm,
- means for sending corresponding power control commands to a mobile radiocommunication network entity.

19. A mobile radiocommunication network entity comprising, for performing a method according to claim 15:
- means for receiving power control commands from a mobile station, and for modifying said power control commands so as to compensate for the effects of transmission interruptions on said power control algorithm, according to said method.

20. A method according to claim 1, wherein said mobile radiocommunication system is of CDMA type.

21. A mobile radiocommunication system including two entities involved in a power control algorithm, and wherein means are provided in one of said entities for signalling to the other entity parameters defining said parts of a recovery period and/or said types of compensation to be carried out in said parts, for performing a method according to claim 1.

22. A mobile radiocommunication system according to claim 21, wherein one of said two entities is a mobile radiocommunication network entity.

23. A mobile radiocommunication system according to claim 21, wherein one of said two entities is a mobile station.

24. A mobile radiocommunication network entity for performing a method according to claim 1.

25. A mobile station for performing a method according to claim 1.

26. A mobile radiocommunication system, comprising at least one mobile station according to any one of claims 25, 14 and 16.

27. A mobile radiocommunication system, comprising at least one mobile radiocommunication network entity according to any one of claims 24, 11 and 19.

* * * * *